United States Patent
Everton et al.

(10) Patent No.: US 10,904,186 B1
(45) Date of Patent: Jan. 26, 2021

(54) EMAIL PROCESSING FOR ENHANCED EMAIL PRIVACY AND SECURITY

(71) Applicant: eTorch Inc, Chicago, IL (US)

(72) Inventors: Paul Everton, Chicago, IL (US); Frank Robles, San Francisco, CA (US)

(73) Assignee: eTorch, Inc., Chicago, IL (US)

( * ) Notice: Subject to any disclaimer, the term of this patent is extended or adjusted under 35 U.S.C. 154(b) by 0 days.

(21) Appl. No.: 16/831,946

(22) Filed: Mar. 27, 2020

(51) Int. Cl.
*H04L 12/58* (2006.01)
*H04L 29/06* (2006.01)
*G06Q 10/10* (2012.01)

(52) U.S. Cl.
CPC .......... *H04L 51/12* (2013.01); *G06Q 10/107* (2013.01); *H04L 51/08* (2013.01); *H04L 51/22* (2013.01); *H04L 51/24* (2013.01); *H04L 51/36* (2013.01); *H04L 63/126* (2013.01); *H04L 63/1441* (2013.01)

(58) Field of Classification Search
CPC ......... H04L 51/16; H04L 51/36; H04L 51/12; H04L 51/22; H04L 51/08; H04L 51/24; H04L 63/12; H04L 63/126; H04L 63/1441; G06Q 10/10; G06Q 10/107
USPC ..................................................... 709/206
See application file for complete search history.

(56) References Cited

U.S. PATENT DOCUMENTS

| | | | |
|---|---|---|---|
| 9,559,997 B1 | 1/2017 | Everton | |
| 9,674,129 B1 * | 6/2017 | Everton | .............. H04L 51/18 |
| 9,824,332 B1 * | 11/2017 | Everton | .............. G06Q 10/107 |
| 9,860,202 B1 | 1/2018 | Everton | |
| 10,096,001 B1 | 10/2018 | Everton et al. | |
| 10,187,342 B2 | 1/2019 | Everton et al. | |
| 10,326,723 B2 | 6/2019 | Everton | |
| 2008/0275957 A1 * | 11/2008 | Pouzin | .............. G06Q 10/10 709/206 |
| 2010/0281122 A1 * | 11/2010 | Li | .............. G06Q 10/107 709/206 |
| 2012/0016924 A1 * | 1/2012 | Farnell | .............. H04L 51/34 709/202 |
| 2014/0173011 A1 * | 6/2014 | Singh | .............. H04L 51/02 709/206 |
| 2018/0097761 A1 * | 4/2018 | Everton | .............. H04L 51/18 |
| 2018/0234368 A1 | 8/2018 | Everton | |
| 2019/0036859 A1 | 1/2019 | Everton et al. | |
| 2019/0356623 A1 | 11/2019 | Everton et al. | |
| 2020/0007502 A1 | 1/2020 | Everton | |

* cited by examiner

*Primary Examiner* — Ruolei Zong
(74) *Attorney, Agent, or Firm* — Nutter McClennen & Fish LLP

(57) ABSTRACT

In accordance with an example implementation of this disclosure, an email processor comprises mailbox management circuitry and replacement email message generation circuitry. The mailbox management circuitry is operable to configure an email message filtering rule for an email mailbox such that email messages that meet criteria specified in the email message filtering rule: bypass an inbox of the email mailbox, and are assigned a first metadata value specified in the email message filtering rule. The mailbox management circuitry is operable to fetch, from the email mailbox, an original email message to which the first metadata value has been assigned. The replacement email message generation circuitry is operable to generate a replacement message for the original email message.

20 Claims, 13 Drawing Sheets

252

| mail_data | | | | |
|---|---|---|---|---|
| account_id \<uid\> | label_id \<uid\> | filter_id \<uid\> | history_id \<uid\> | access_expiration \<timestamp\> |
| ○○○ | | | | |

254

| credentials | | |
|---|---|---|
| account_id \<uid\> | token \<guid\> | expiration \<timestamp\> |
| ○○○ | | |

256

| message_map | |
|---|---|
| original_id \<uid\> | new_id \<guid\> |
| ○○○ | |

FIG. 2B

EMAIL PROCESSING FOR ENHANCED EMAIL PRIVACY AND SECURITY

BACKGROUND

Email is by far the most common "threat vector" for identify theft, ransomware, and other cybercrimes. Email practices such as open tracking (aka "spymail") enhance the security risks of email, and also infringe upon the privacy of email users. Systems and methods for improving the privacy and security of email are needed.

BRIEF DESCRIPTION OF THE DRAWINGS

FIG. 2B shows example data structures used by the email processor for processing email messages.

DETAILED DESCRIPTION

Figure 1:
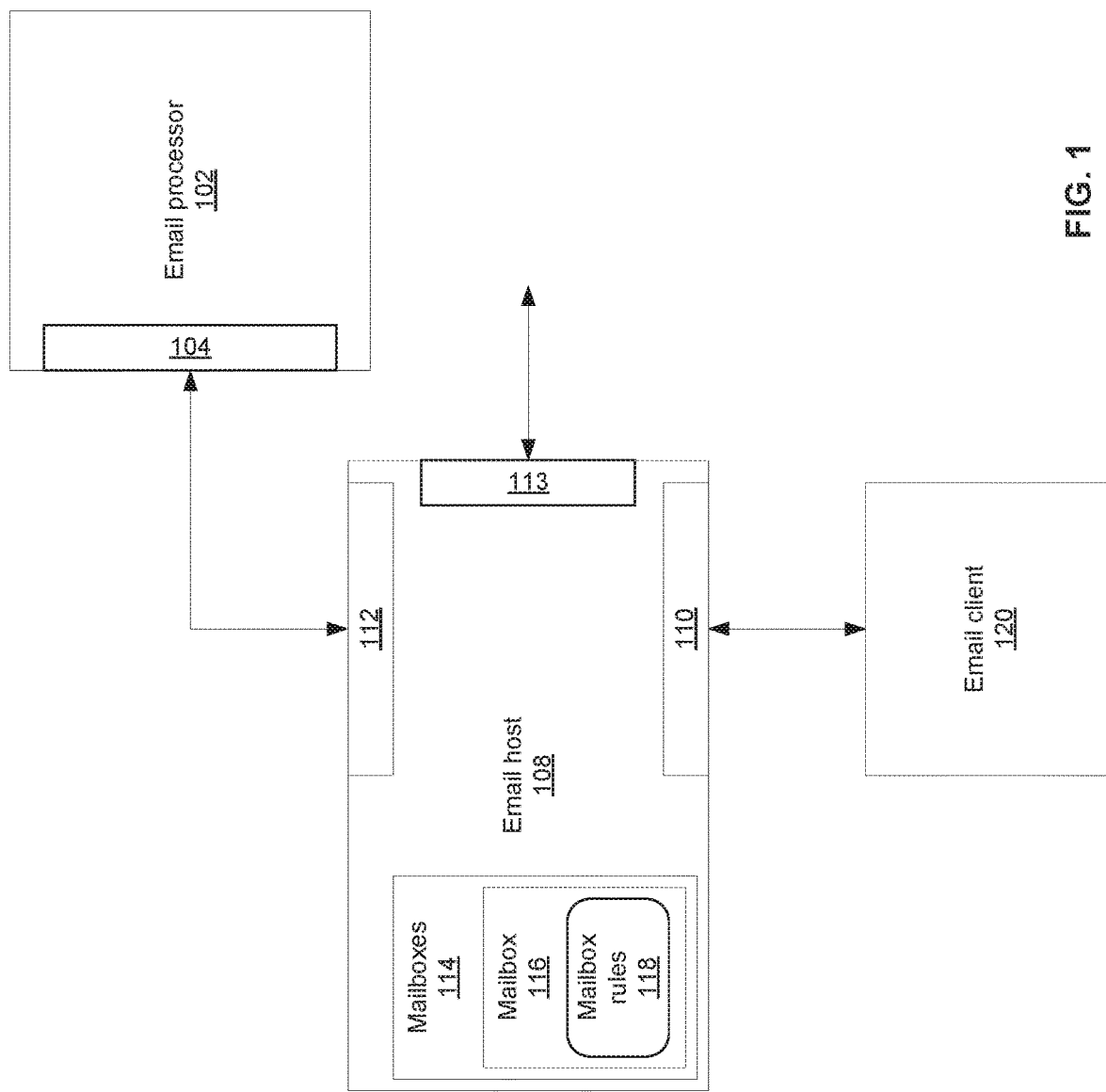
FIG. 1 shows an example system configured for enhanced email privacy and security.

FIG. 1 shows an example system configured for enhanced email privacy and security. Shown are an email processor 102, an email host 108, and an email client 120.

The email client 120 comprises a desktop application, mobile application, or web application operable to interface with the email host 108 to provide a user interface via which owners of mailboxes 114 hosted on the email host 108 can create, read, update, delete, and/or otherwise interact with their email messages. Example implementations of the email client 120 include the desktop, mobile, or web version of Microsoft Outlook, Google Gmail, Apple Mail, etc.

The email host 108 comprises one or more email servers operable to host one or more email mailboxes 114 and to send and receive email messages over a network. The email host 108 comprises interface circuitry 113, interface circuitry 112, and interface circuitry 110. Example email hosts include Google (e.g., their free Gmail service or paid GSuite service), Microsoft (e.g., their free Outlook.com service, paid Office 365 service, or paid on-premises Exchange servers), and others.

The mailboxes 114 comprise, for example, a file system for storing the content of email messages and one or more data structures for managing the email messages and associated metadata.

The interface circuitry 112 comprises, for example, a web server operable to handle HTTP(S) requests, a web client operable to send HTTP(S) requests, and an Ethernet network adaptor operable to send and receive the HTTP(S) requests to and from a network (e.g., the Internet). In an example implementation, the interface circuitry 112 exposes an application programming interface (API) via which the email processor can, upon providing proof of authorization, configure the mailbox rules 118 for mailbox 116, read email messages from mailbox 116, and insert email messages into mailbox 116.

The interface circuitry 113 comprises, for example, circuitry operable to generate and process SMTP messages, and an Ethernet network adaptor operable to send and receive the SMTP messages to and from a network (e.g., the Internet).

The interface circuitry 110 comprises, for example, a server operable to support IMAP, POP3, ActiveSync, and/or any other protocol used by email client 120 to interface with email host 108.

The email processor 102 comprises circuitry operable to communicate with the email host 108 via interface circuitry 104 to configure the mailbox rules 118, monitor the mailbox 116, read messages from the mailbox 116, and insert messages into the mailbox 116. Details of an example implementation of the email processor 102 are described below with reference to FIGS. 2A and 2B.

Figure 2A:
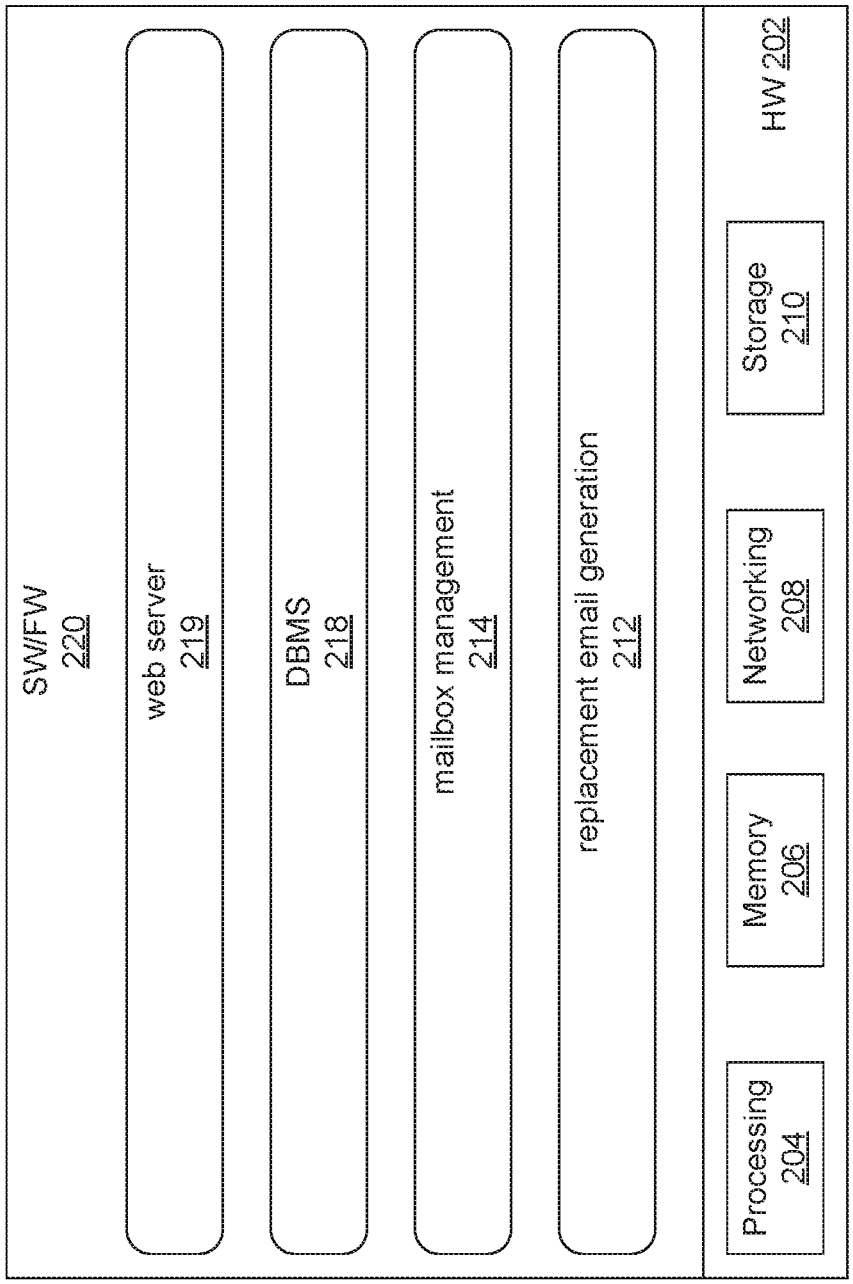
FIG. 2A shows details of an example implementation of the email processor of FIG. 1.

FIG. 2A shows details of an example implementation of the email processor of FIG. 1. The hardware 202 comprises processing resources 204 (e.g., one or more CPUs across one or more computers), memory resources 206 (e.g., one or more DRAM modules across one or more computers), networking resources 208 (e.g., circuitry of one or more network interface cards across one or computers), and storage resources 210 (e.g., one or more solid-state drives and/or hard disk drives). The software and/or firmware 220 runs on the hardware 202 to realize database management system (DBMS) circuitry 218, mailbox management circuitry 214, replacement email message generation circuitry 212, and web server circuitry 219.

The database management system (DBMS) circuitry 218 is operable to implement a SQL, NOSQL, and/or graph database and logic for managing insertion and retrieval of data from the database. Example schema for the database are described below with reference to FIGS. 2B and 8.

The mailbox management circuitry 214 is operable to configure the mailbox rules 118 for the mailbox 116. The mailbox config management duration circuitry 214 is operable to, for example: configure filters that determine which metadata is assigned to each incoming email message (e.g., to which label/category/folder—such as "inbox"—each incoming message is assigned); and configure notifications to be sent to the email processor 102 (e.g., under which conditions to send a new email notification to the email processor 102) and/or to the owner of the mailbox 116 (e.g., under what conditions should the owner be alerted that she has a new email messages in her mailbox).

The mailbox management circuitry 214 is also operable to receive notifications of new messages from the email host 108. In an example implementation, a new message notification is a GET or POST HTTP(S) request that provides one or more fields (e.g., a mailbox identifier and/or a message identifier) that can be used to retrieve the message via the interface 112. The mailbox management circuitry 214 is also operable to, in response to such a notification, query the mailbox to retrieve the content of the new message that triggered the notification. The mailbox management circuitry 214 is also operable receive messages from the replacement email message generation circuitry 212 and insert those replacement messages into the mailbox 116.

The replacement email message generation circuitry 212 is operable to: analyze email messages retrieved from the mailbox 116 by the mailbox management circuitry 214; and generate new email messages for insertion into the mailbox 116.

The web server 219 is operable to serve a website via which the owner of mailbox 116 can create an account with the email processor 102 and configure an OAuth token that enables email processor 102 to interact with mailbox 116. The web server 219 may also host remote content (e.g., images, videos, etc.) linked to by replacement messages generated by replacement email message generation circuitry 212. (the replacement email message generation circuitry 212 may fetch the content from the host linked to in the original email message and store it in storage 210).

FIG. 2B shows example data structures used by the email processor for processing email messages. Shown are a mail_data table 252, a credentials table 254, and a message_map table 256.

The mail_data table 252 stores an identifier of a label created on the mailbox 116 (see e.g., block 304 of FIG. 3A), an identifier of a filter created on the mailbox 116 (see e.g., block 306 of FIG. 3A), an identifier of a history of changes made to the mailbox 116 (e.g., the history shows creation and deletion of labels, filters, etc.). These identifiers can be used to validate changes made to the mailbox 116, as well as to reverse changes made to the mailbox 116 upon disconnecting the mailbox 116 from the email processor.

The credentials table 254 stores credentials that the email processor 102 can use to access the mailboxes 114 on the email host 108. For example, a record in the credentials table for mailbox 116 includes: an identifier of the mailbox 116 on the email host 108; a token field that stores an OAuth 2.0 token for that grants email processor 102 access to mailbox 116; and a timestamp field that indicates when the OAuth 2.0 token expires.

The message_map table 256 provides a map between a message id of original emails received in the mailboxes 114 and replacement emails inserted into the mailboxes 114.

Figure 3A:
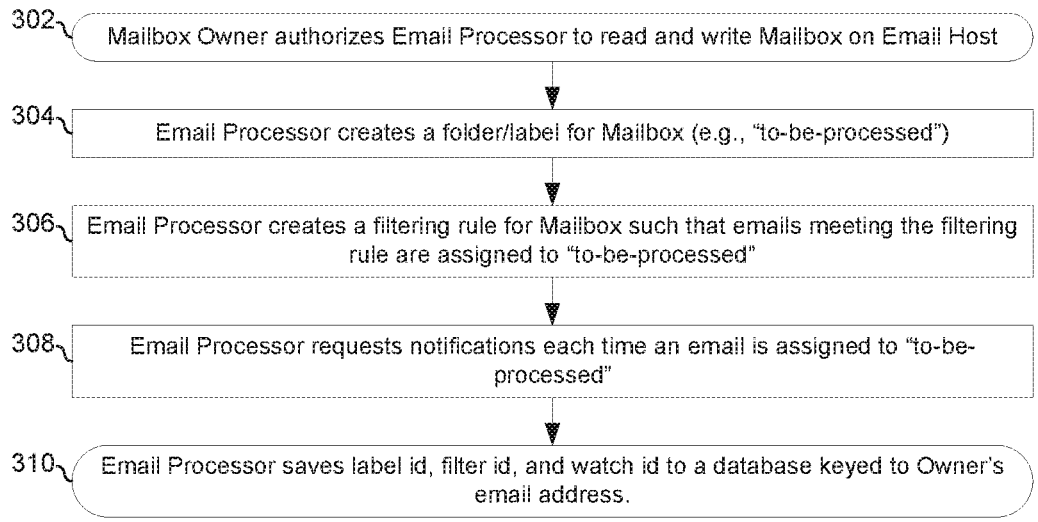
FIG. 3A is a flowchart for an example process of connecting the email processor to a mailbox.

FIG. 3A is a flowchart for an example process of connecting the email processor to a mailbox.

The process begins with block 302 in which the owner of mailbox 116 grants email processor 102 read and write permissions for mailbox 116. This may comprise the owner logging into to her account with the email host 108 and instructing email host 108 to provide an OAuth 2.0 token to the email processor 102.

In block 304, the mailbox management circuitry 214 uses the interface 112 to create a metadata value (e.g., a "label" according to Gmail terminology or a "folder" according to Microsoft terminology) that can be applied to new incoming email messages. For illustration, the metadata value is referred to here as a "to-be-processed" label.

In block 306, the mailbox management circuitry 214 uses the interface 112 to create a mailbox rule 118 for mailbox 116 that will: (1) assign the "to-be-processed" label to any new email message that meets criteria set in the mailbox rule 118; (2) prevent the message from showing in the inbox of mailbox 116 (e.g., prevent an "inbox" label from being assigned to the new message); and (3) prevent a new mail notification (e.g., push message to email client 120) from being generated. In an example implementation, the criteria is a single criterion that the email message is an incoming—and not sent/outgoing—message.

In some instances, the email host 108 may require the rule 118 to have at least one criterion based on the content of the incoming email message. In such an instance, the criterion may be that the content of the email message (the subject and/or body) does not contain a string that normal email messages are very unlikely to ever have. For example, the filter may apply the "to-be-processed" label to all incoming email messages that do not contain 1AG1D3498 in the subject (where 1AG1D3498 is a string selected to be very unlikely to ever occur in the subject line of an incoming email message).

In block 308, the mailbox management circuitry 214 uses the interface 112 to configure a webhook such that the email host 108 will notify the email processor 102 via the interface 104 each time a new email message arrives and is assigned the "to-be-processed" label.

In block 310, the mailbox management circuitry 214 uses the DBMS 218 to save a record for mailbox 116 to the mail_data table 252.

Figure 3B:
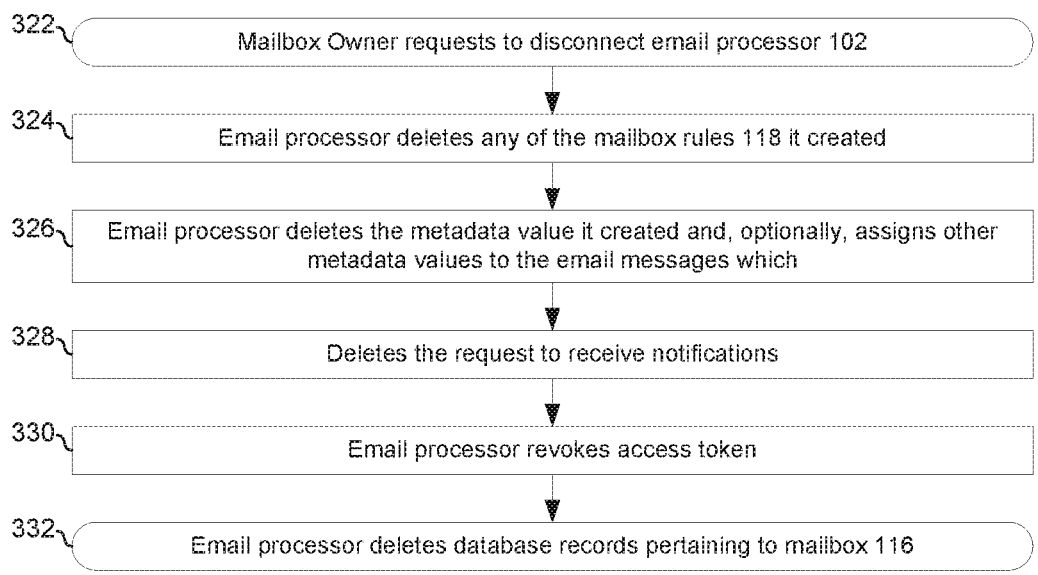
FIG. 3B is a flowchart for an example process of disconnecting the email processor from a mailbox.

FIG. 3B is a flowchart for an example process of disconnecting the email processor from a mailbox.

The process begins with block 322 in which the owner of mailbox 116 requests (e.g., via an interface hosted by web server 219) the email processor 102 to stop processing email messages for mailbox 116.

In block 324, the email processor 102 uses the entry for mailbox 116 in the mail_data table 252 to delete, via interface 112, the mailbox rule 118 created in block 304 of FIG. 3A.

In block 326, the email processor 102 uses the entry for mailbox 116 in the mail_data table 252 to delete, via interface 112, the metadata value created in block 306 of FIG. 3A. In an example implementation, the block 326 also comprises the email processor 102 assigning one or more different metadata values to email messages which were previously assigned the metadata value being deleted. As an example, any email messages assigned the "to-be-processed" label may be assigned an "inbox" label such that the email messages will show up in the mailbox owner's inbox upon disconnection of the email processor 102 (since the rule created in block 306 of FIG. 3A caused the messages to skip the inbox).

In block 328, the email processor 102 uses the interface 112 to notify the email host 108 to no longer send it new message notifications for mailbox 116 (e.g., it disables a webhook previously configured on the email host 108).

In block 330, the email processor revokes the authorization token provided in block 302 of FIG. 3A.

In block 332, the email processor 102 deletes any entries pertaining to mailbox 116 from the DBMS 218.

Figure 4:
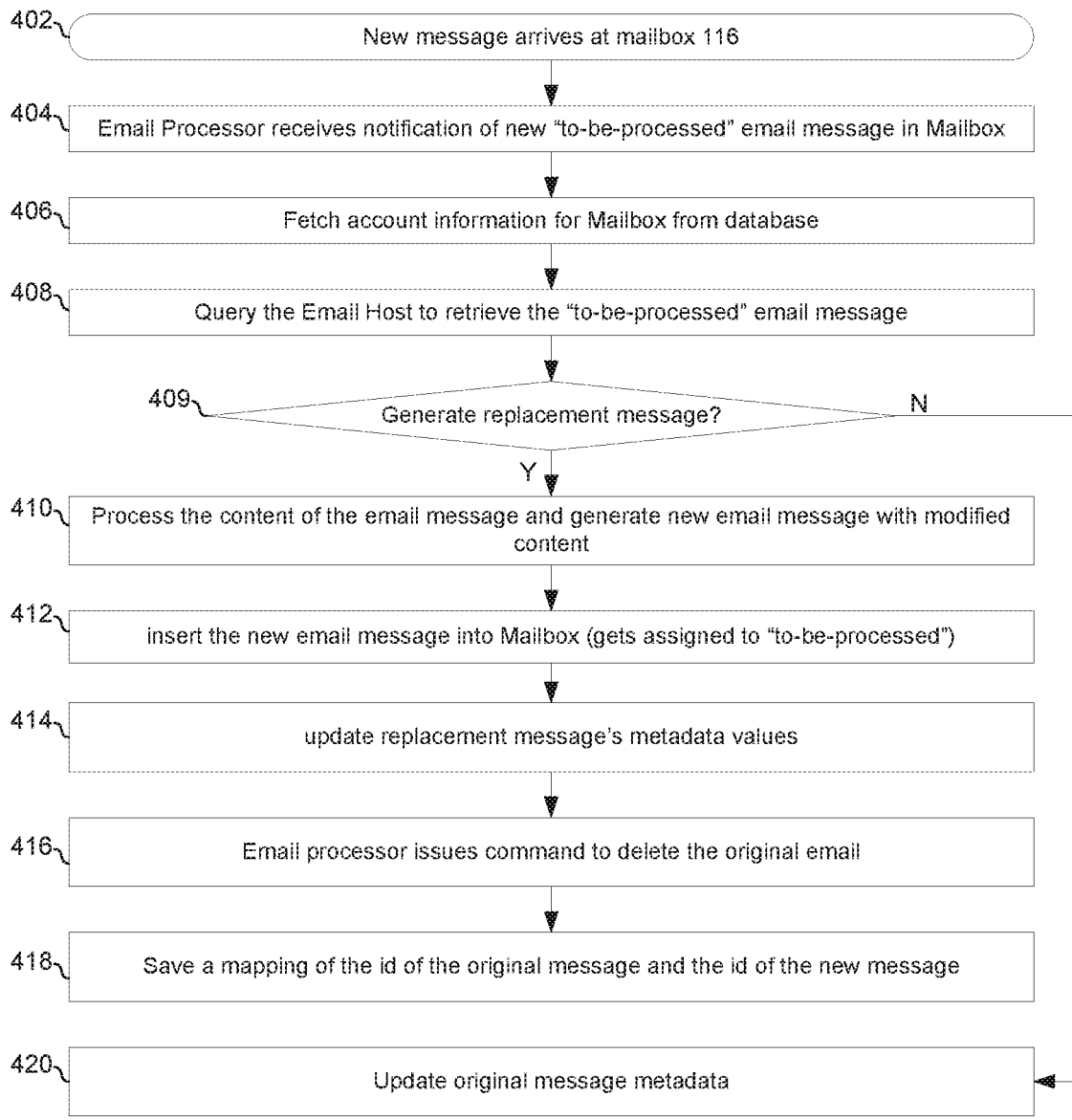
FIG. 4 is a flowchart illustrating an example process by which the email processor replaces emails in a connected mailbox.

FIG. 4 is a flowchart illustrating an example process by which the email processor replaces emails in a connected mailbox.

The process begins with block 402 in which an email message arrives at mailbox 116. The message is assigned the "to-be-processed" label according to the rule set in block 306 of FIG. 3A, and so skips the inbox and the user is not notified of the new message.

In block 404, the mailbox management circuitry 214 receives a notification of the new message from the email host 108 via interface 104.

In block 406, the mailbox management circuitry 214 uses DBMS 218 to fetch the entry for mailbox 116 from the mail_data table 252.

In block 408, the mailbox management circuitry 214 uses the data fetched from the database to retrieve the "to-be-processed" email message (referred to as the "original message") from email host 108 via interface 112.

In block 409, the original message is analyzed to determine whether it needs to be replaced with a replacement message. This analysis may inspect one or more of the envelope, headers, message body, attachments, and/or content remotely linked to in the original message (the email processor 102 may visit/download/etc. the remote content and scan it) of the original message to determine whether criteria for a replacement message are met. The criteria may include matching text against strings, regular expressions, blacklists, whitelists, etc. The criteria may include the presence, absence, number, etc. of edges and/or nodes related to the message's sender and/or the mailbox owner in a graph database. The criteria may, for example, be tailored to detect URLs which marketers and other third parties are using to: detect whether the email message has been opened by the recipient; whether hyperlinks within the email message have been clicked; and/or the like. In this regard, the analysis may comprise generation of a tracking metric indicating the likelihood that content of the email message is being used (by marketers, etc.) for online behavior tracking (or just "tracking" as used herein). Example tracking activities include: tracking what email messages are being opened, tracking when email messages are being opened, tracking from which devices email messages are being opened, tracking how long email messages are being read, tracking from which geographical locations email messages are being opened, tracking what hyperlinks are being followed, tracking when hyperlinks are being followed, tracking from which devices and/or browsers hyperlinks are being followed, tracking from which geographical locations hyperlinks are being followed, tracking what URLs are being visited, tracking when URLs are being visited, tracking from which devices and/or browsers URLs are being visited, tracking from which geographical locations URLs are being visited, tracking what email attachments are being downloaded and/or opened, tracking when email attachments are being downloaded and/or opened, tracking from which devices email attachments are being downloaded and/or opened, and/or tracking from which geographical locations email attachments are being downloaded and/or opened. The value of the tracking metric for the HTML element may, for example, be based on the URL of the HTML element containing one or more regular expressions and/or substrings which have previously been identified as being associated with companies which perform such tracking (and are stored in the database 124). The value of the tracking metric for the HTML element may, for example, be based on attributes of the HTML element such as size (e.g., images which are below some threshold number of pixels may correspond to higher tracking metric values (i.e., higher likelihood of being used for tracking)) and/or transparency (e.g., images having a transparency attribute that is above a determined threshold may correspond to higher tracking metric values). The value of the tracking metric for the HTML element may, for example, be based on location of the image within the message body (e.g., the replacement email message generation circuitry 212 may be configured to detect email sender signatures within message bodies, and images which are below the signature may be correspond to higher tracking metric values). If the original message needs to be replaced, then the process advances to block 410. If the original message does not need to be replaced, then the process advances to block 420.

In block 410, the replacement email message generation circuitry 212 parses the original message and generates a new email message that corresponds to the original message, but may have one or more modifications to the headers, body content, and/or attachments. Example modifications made to the replacement message are described below with reference to FIGS. 5, 6, 7A-7D, and 9. The replacement message may be given the same thread (or "conversation") identifier as the original message so that the replacement message will show up in the email chain/reply history just as the original message would have. The email host 108 may, for example, determine to which thread to assign a message based on one or more headers (e.g., a message identifier) of the message, a subject field of the message, and/or the sender(s) and/or recipient(s) of the message.

In block 412, mailbox management circuitry 214 inserts the replacement email message generated in block 410 into mailbox 116. The replacement message gets assigned the "to-be-processed" label according to the rule created in block 306 of FIG. 3A.

In block 414, the mailbox management circuitry 214 updates the metadata of the replacement message. This may include: (1) copying any metadata values from the original message to the replacement message (e.g., the original message may have been assigned a "promotions" label, and thus the mailbox management circuitry 214 applies the "promotions" label to the replacement message); (2) removing the "to-be-processed" label; and (3) adding "inbox" and "unread" labels so that the replacement message will appear in the inbox of mailbox 116 and a new email notification will be generated. Inserting the replacement message into the mailbox 116 and then modifying the metadata may prevent the mailbox rules 118 from being applied again to the replacement message.

In block 416, the mailbox management circuitry 214 issues a command, via interface 112, to delete the original email message from mailbox 116.

In block 418, the mailbox management circuitry 214 uses the DBMS 218 to save a record for this pair of original and replacement messages in the message_map table 256. This record helps the email processor 102 deal with duplicates of the original message (which are common for SMTP email messages). Specifically, if a duplicate of the original email is subsequently received, the entry in the message_map table 256 tells email processor 102 that a replacement message has already been generated for this particular message and the duplicate can simply be deleted.

In block 420, the metadata of the original message is updated. In an example implementation, this comprises: (1) removing the "to-be-processed" label from the original message; and (2) adding "inbox" and "unread" labels so that the replacement message will appear in the mailbox owner's inbox and a new email notification will be generated.

Figure 5:
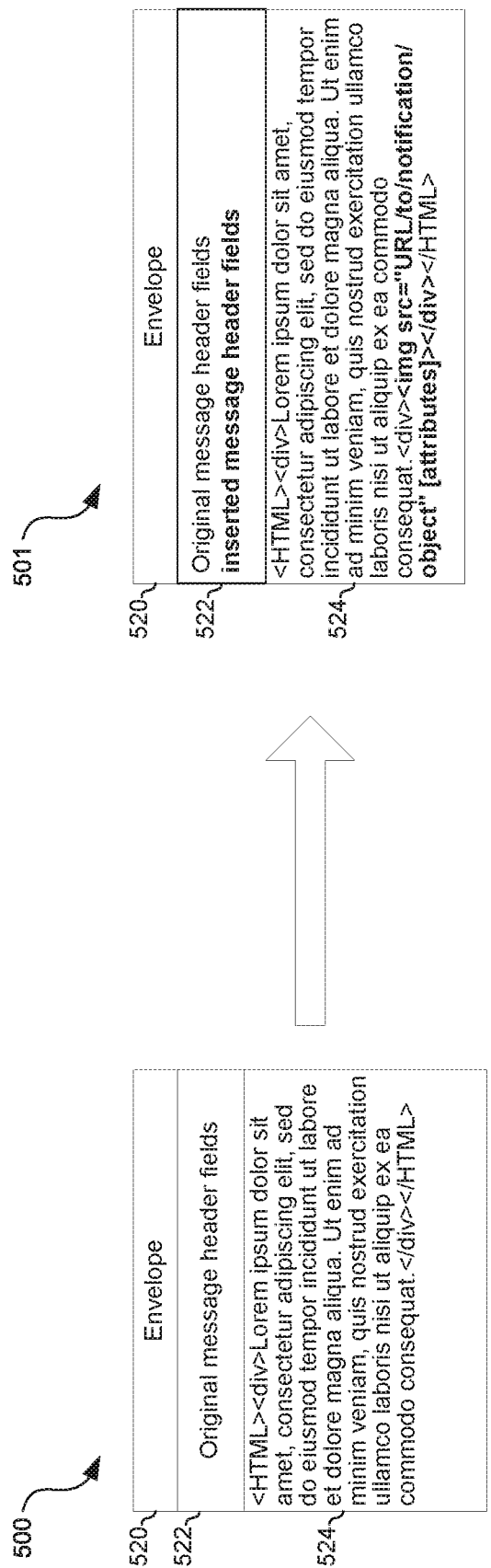
FIG. 5 illustrates an example implementation in which content not in an original email is inserted in a corresponding replacement email.

FIG. 5 illustrates an example implementation in which content not in an original email is inserted in a corresponding replacement email. In FIG. 5 is shown an original email message 500 and a corresponding replacement email message 501, each of which comprises an envelope 520, headers 522, and message body 524. As shown, in the replacement email message, the replacement email message generation circuitry 212 has inserted additional headers in headers 522 of the replacement message 501, and has inserted additional content (an HTML element with inner text in this case) into the message body 524 of the replacement message 501.

Figure 6:
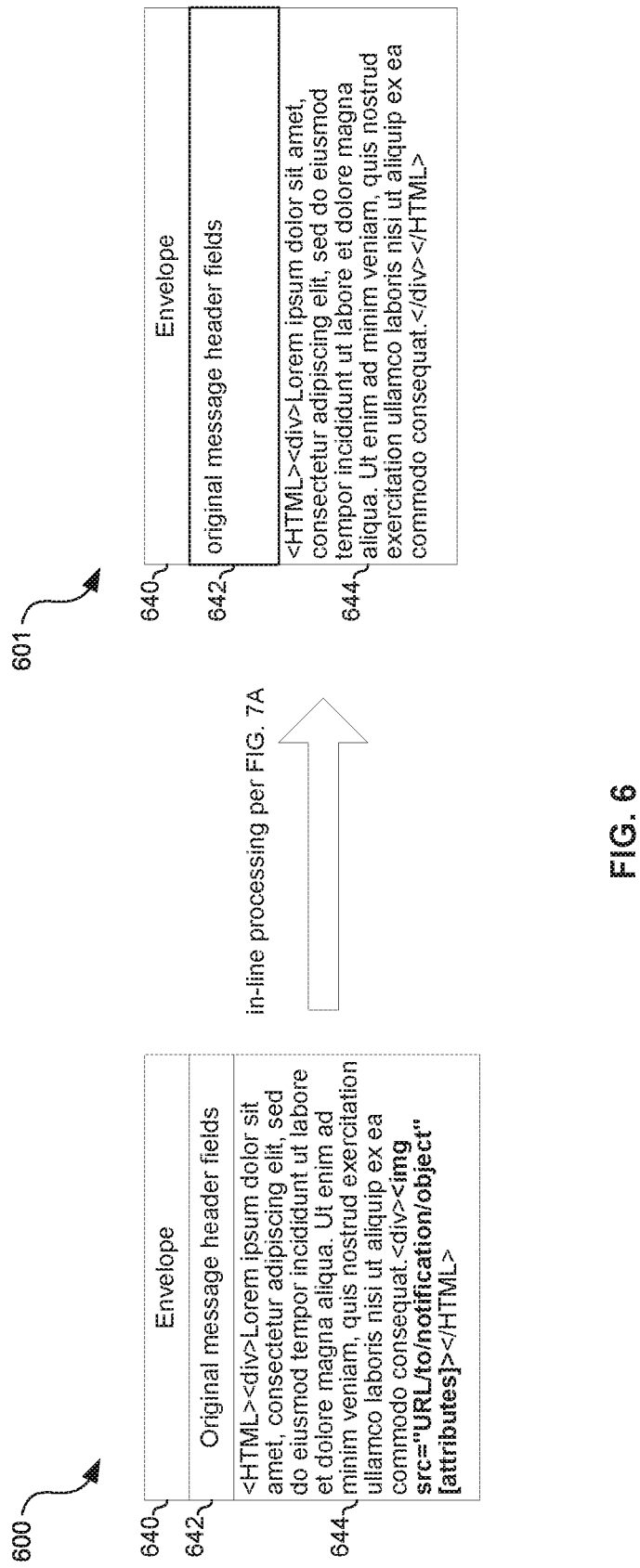
FIG. 6 illustrates an example implementation in which content in an original email is removed from a corresponding replacement email.

FIG. 6 illustrates an example implementation in which content in an original email is removed from a corresponding replacement email. In FIG. 6 is shown an original email message 600 and a corresponding replacement email message 601, each of which comprises an envelope 640, headers 642, and message body 644. As shown, in the replacement email message 601, the replacement email message generation circuitry 212 has removed an HTML element (an image tag in this case).

Figure 7A:
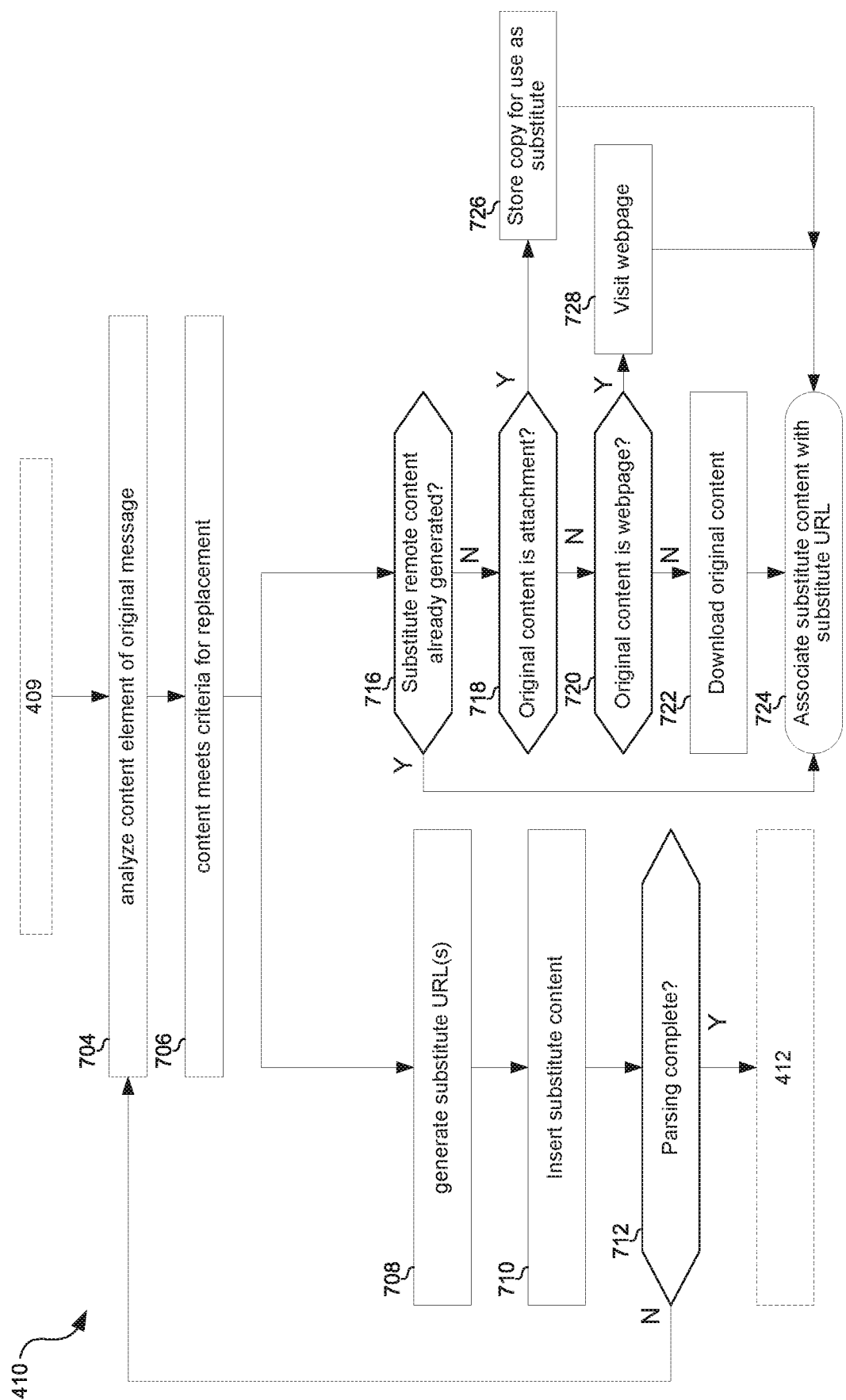
FIG. 7A is a flowchart illustrating an example process for generating replacement messages in which content of the original email message has been replaced with substitute content.

FIG. 7A is a flowchart illustrating an example process for generating replacement messages in which content of the original email message has been replaced with substitute content.

In block 704, the replacement email message generation circuitry 212 analyzes a next element (character/word/line/etc.), of the original email message.

In block 706, the replacement email message generation circuitry 212 detects original content of the email message that meets criteria for replacement (e.g., because it matches substring, regular expression, has certain relationships on a graph, etc.).

In block 708, if the original content comprises remote content, then in block 708 the replacement email message generation circuitry 212 generates a URL for the substitute content. In block 710, the replacement email message generation circuitry 212 inserts the substitute content in place of the original content in the replacement email message. The text and/or attachments of the substitute content (including any URLs generated in block 708) may be retrieved from the DBMS 218 and/or generated on the fly. For example, text of the original content may comprise a <div> or <span> element containing an <img> element referencing an original URL, and the substitute content inserted in its place may comprise a <div> or <span> element containing an <img> element referencing a substitute URL generated in block 708. In block 712, if further parsing of the email message is to be performed (e.g., the parser has not reached the end of the email message, has more time available for parsing, has not reached a maximum amount of content substitutions, and/or any other criteria for continuing parsing) the process returns to block 704.

In 716, the replacement email message generation circuitry 212 determines whether it has previously generated substitute remote content corresponding to the original content detected in block 706. If so, then the process advances to block 724. In block 724, the substitute remote content is associated with the one or more substitute URLs generated in block 708. In this manner, the web server 219 will be ready to serve the substitute content in response to receiving a request for the substitute URL(s).

Returning to block 716, if replacement email message generation circuitry 212 has not previously generated substitute content for the original content detected in block 706, the process advances to block 718. In block 718, if the original content to be replaced is an attachment, the process advances to block 726. In block 726, the email processor fetches the attachment and stores it to storage 210 where it is accessible via web server 219. After block 726, the process advances to block 724. In block 724, the copy of the content stored in the database 124 is associated with one or more substitute URLs generated in block 708.

Returning to block 718, if the content to be replaced is not an attachment, then the process advances to block 720. In block 720, if the original content comprises a web page (i.e., the original content comprises a link to the web page) then the process advances to block 728. In block 728, the replacement email message generation circuitry 212 visits the web page to gather information about the web page. In an example implementation, this comprises crawling the web page to detect what the content of the web page is. In an example implementation, this comprises replacement email message generation circuitry 212 automatically launching a web browser, navigating to the original URL in the browser, and either or both: caching content of the web page (e.g., by downloading the html file(s), CSS file(s), javascript file(s), and/or other content of the web page) and/or capturing one or more images ("screenshots") of the web page. After block 728, the process advances to block 724. In block 724, the information gleaned from the web page visit (e.g., a copy of web page in plain text format with references/links disabled, a "sandboxed" cache of the web page hosted by the replacement email message generation circuitry 212, and/or screenshots of the web page) is associated with one or more URLs generated in block 708.

Returning to block 720, if the original content is not a web page, the process advances to block 722 in which a copy of the original content (e.g., any type of downloadable file, just a few common examples of which are: .gif, .jpeg, .png, .pdf files) is downloaded to storage 210 and made available via web server 219. The downloaded copy is then used as the substitute content (e.g., after a virus scan). After block 722 the process advances to block 724 and one or more URLs generated in block 708 are associated with the copy of the content obtained in block 722.

Figure 7B:
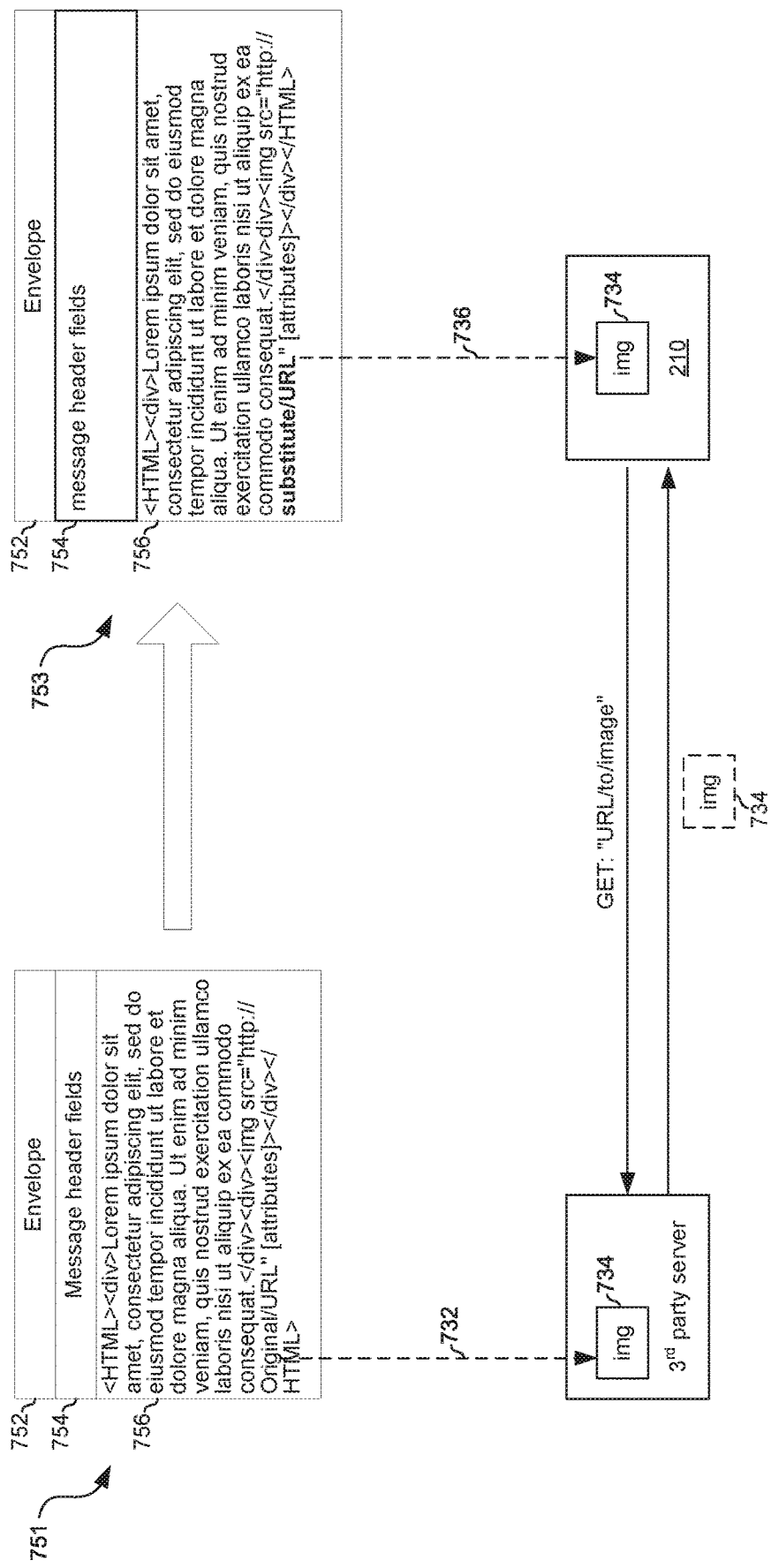
FIG. 7B illustrates an example implementation in which an HTML image element of the original message is replaced by a substitute HTML image element in the replacement message.

FIG. 7B illustrates an example implementation in which an HTML image element of the original message is replaced by a substitute HTML image element in the replacement message. As shown, the HTML image element having a URL of "http://Original/URL" in the original message 751 has been replaced with an HTML image element having a substitute URL of "http://Substitute/URL" in the message body 756 of the replacement email message 753. In the example shown, as indicated by arrow 732, the original URL points to an image file 734 stored on a server that is not part of the email processor 102. In response to determining to replace the original HTML image element, the replacement email message generation circuitry 212 downloads the image file 734 from the third-party server (e.g., using an http get request as shown) to storage 210. The replacement email message generation circuitry 212 then associates the downloaded copy of the image 734 with the substitute URL as indicated by the arrow 736. In another example implementation, rather than downloading a copy of the image 734, replacement email message generation circuitry 212 may generate, and store in storage 210, a substitute image file having the same attributes as the image file 734 (e.g., same size and transparency) and the substitute URL may be associated with the substitute image file so that the substitute image file is served in response to a request to the substitute URL.

Figure 7C:
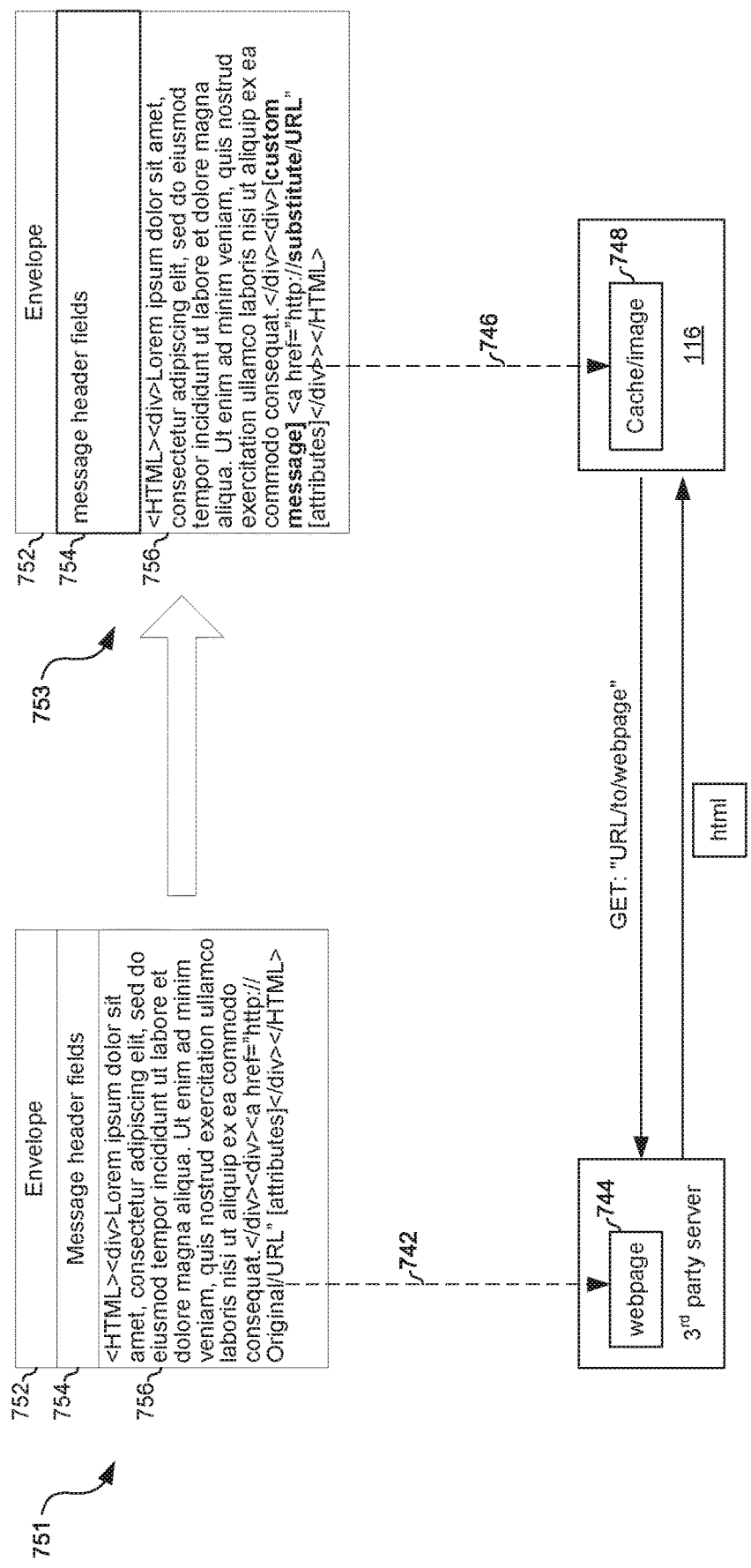
FIG. 7C illustrates an example implementation in which a hyperlink to a web page in the original message is replaced in the replacement message by a substitute content comprising information about the web page referenced by the original hyperlink.

FIG. 7C illustrates an example implementation in which a hyperlink to a web page in the original message is replaced in the replacement message by a substitute content comprising information about the web page referenced by the original hyperlink. As shown, in the message body 756 of the original message 751, the HTML <div> element comprising a hyperlink targeting an original URL of "http://Original/URL" has been replaced in the replacement message 753 with an HTML <div> element having a custom message and a hyperlink targeting a substitute URL of "http://Substitute/URL." In the example shown, as indicated by arrow 742, the original URL points to a web page 744 stored on a server that is not part of the email processor 102. In response to determining to replace the original hyperlink, the replacement email message generation circuitry 212 visits the web page 744 and gathers information about the web page (e.g., caches a copy of the web page in the database 124, captures images of the web page, performs a web page to pdf document conversion, and/or the like). In the example shown, the information gathered comprises a cached or imaged version of the web page 744. The replacement email message generation circuitry 212 then associates the cached copy and/or images 748 with the substitute URL as indicated by the arrow 746. The custom message may, for example, explain that the hyperlink targets a substitute URL and give the reason why the hyperlink was replaced. For example, the message may indicate which custom processing rule(s) triggered the replacement (e.g., the message may say that the original URL was replaced because a tracking metric for the original URL was above a determined threshold). The message may, for example, provide the original URL and recommend that, if the recipient wants to follow it, that s/he do so by copy-and-pasting it into a browser in "private" or "incognito" mode. If the recipient follows the substitute hyperlink, the imaged and/or cached version may present a similar message.

Figure 7D:
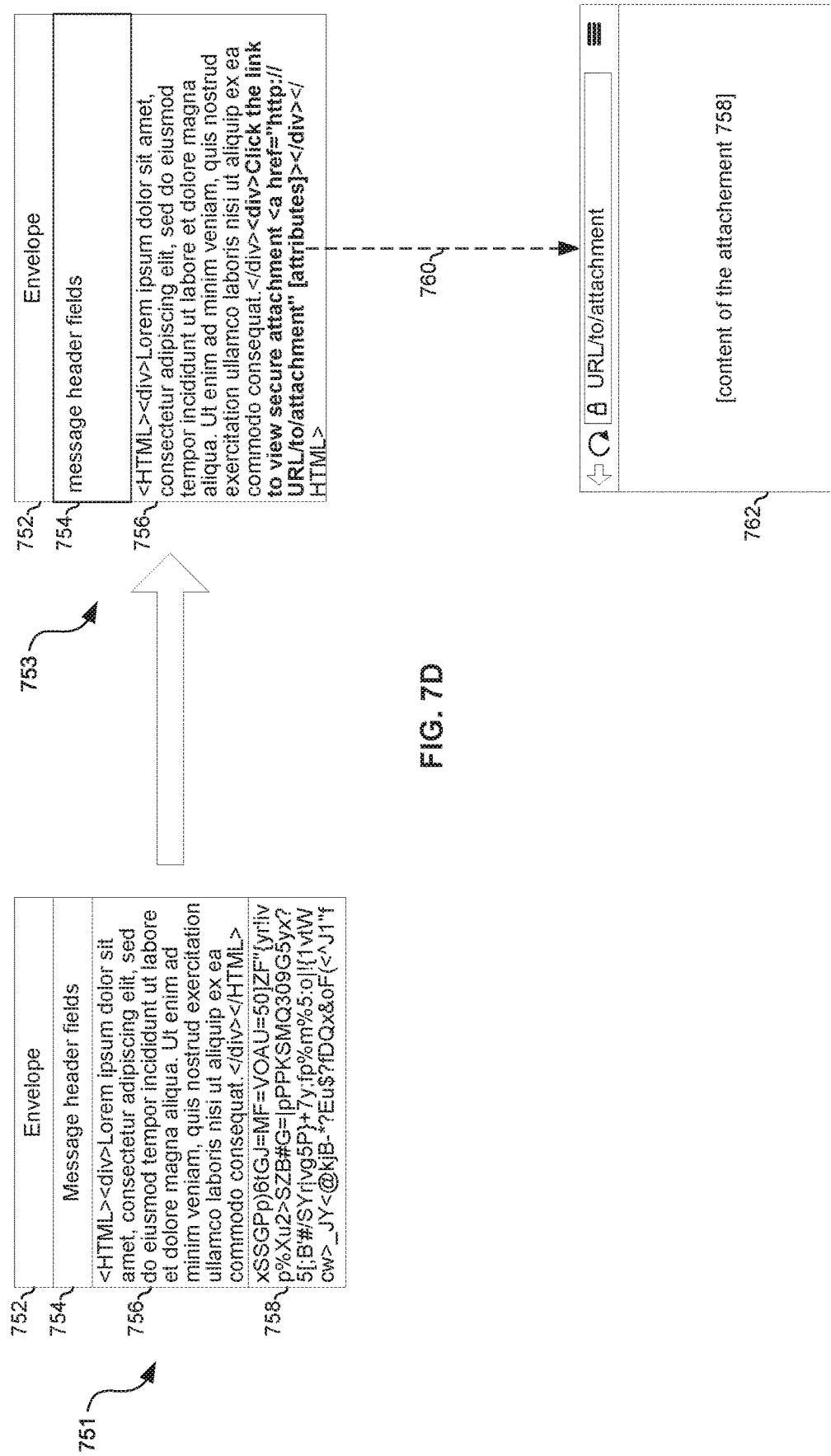
FIG. 7D illustrates an example implementation in which an attachment to an email message in the original message is removed from the replacement message and a hyperlink to a securely hosted copy of the attachment is inserted into the body of the replacement email message.

FIG. 7D illustrates an example implementation in which an attachment to an email message in the original message is removed from the replacement message and a hyperlink to a securely hosted copy of the attachment is inserted into the body of the replacement email message. As shown, the attachment 758 of the original message 751 has been removed and replaced by a hyperlink in the message body 756 of the replacement message 753. As represented by the dashed line 760, the hyperlink points to the attachment 758 accessible via web server circuitry 219. When clicked by the user, a browser 762 may open and display the content of the attachment 758.

Figure 8:
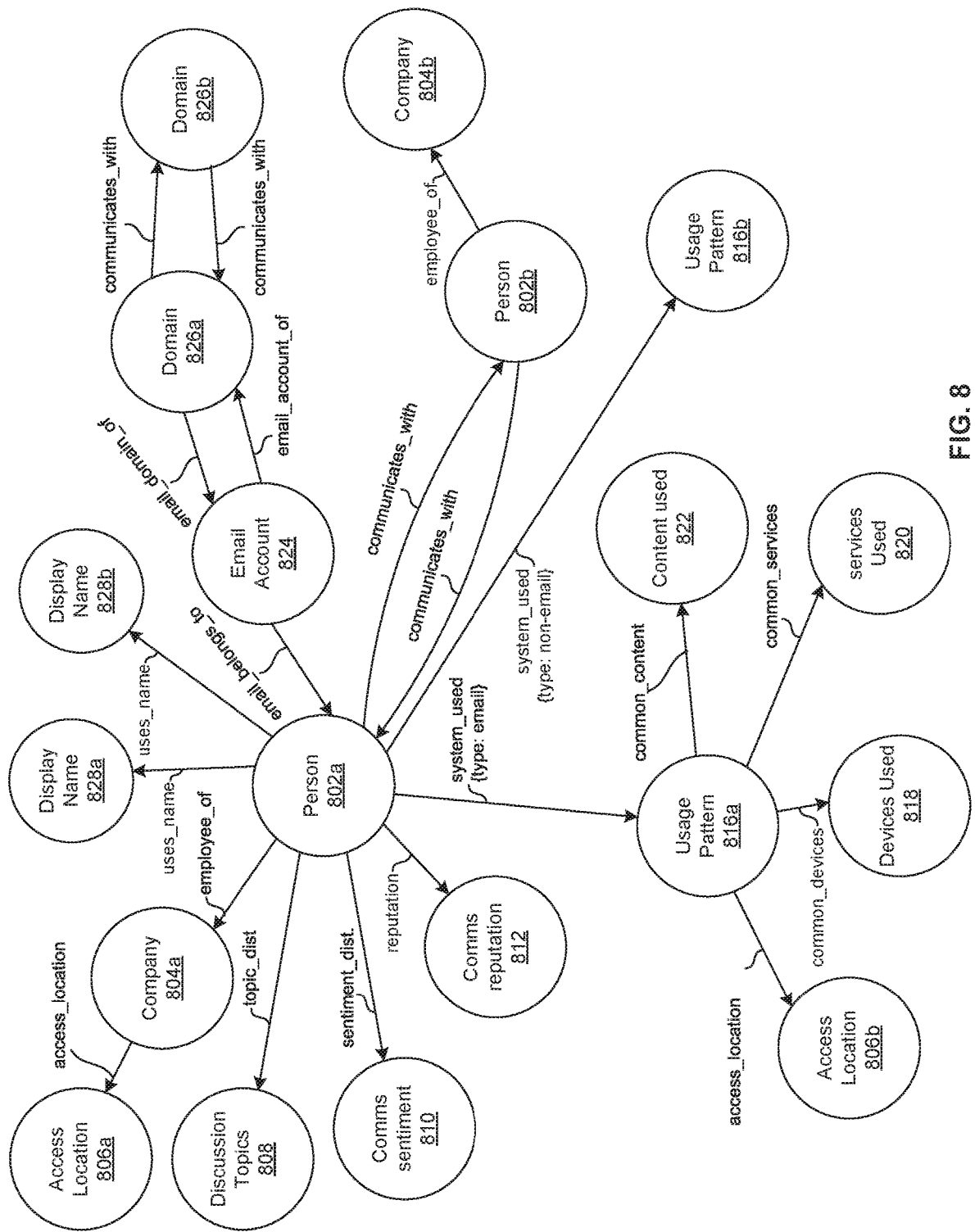
FIG. 8 illustrates an example implementation of the database of the email processor.

FIG. 8 illustrates an example implementation of the database of the email processor. The example database is a graph database comprising multiple types of vertices (representing real-world things) and multiple types of edges (representing relationships between the vertices). A list of example vertices and edges—and properties associated with those vertices and edges—will now be described. In an example implementation, the email processor 102 adds vertices, adds edges, and sets properties of the vertices and edges using: (1) data extracted/generated from analyzing email messages that pass through the email processor 102; (2) data received as part of web requests for remotely-hosted content linked-to in emails handled by the email processor 102; and (3) data received from third-party systems.

Each Person vertex 802 represents a person. Example properties of a Person include: an employee identification number, a location (e.g., city), a username (e.g., "john"), and an email address (e.g., "john@acme.com"). For purposes of illustration, two Person vertexes 802a and 802b are shown.

The Company vertices 804 represent non-person entities (Corporation, organization, etc.). Example properties of a company vertex include the company's name. For purposes of illustration, two Company vertexes 804a and 804b are shown.

The Access_Location vertices 806 represent physical locations. Example properties of an Access_Location vertex include latitude, longitude, city, radius (e.g., radius from a defined point that is considered to be part of the same Access_Location), and/or Internet Protocol (IP) Address(es) associated with the Location.

Discussion_Topic vertices 808 represent topics discussed in email messages. Example properties of a Discussion_Topic vertex include: the topic discussed in a message (e.g., "information security," "Product X", "Company Y", etc.), the frequency with which each topic is discussed, the total number of times the topic has been discussed, and the length of a discussion on the topic (e.g., in numbers of characters, numbers of email messages, etc). In an example implementation, properties of Discussion_Topics are set/updated by analyzing messages using neural topic model (NTM) machine learning algorithms.

Communications_Sentiment vertices 810 represent emotional states present in communications. Example properties of a Communications_Sentiment vertex include: emotions detected in messages (e.g., "happy,", "stressed," etc.), the frequency with which each emotion is detected, the total number of times the each emotion has been discussed. In an example implementation, communications_sentiment vertices are populated by analyzing messages using sentiment analysis machine learning algorithms.

Communications_Reputation vertices 812 represent a reputation of a person on one or more communication media. A Person's Communication_Reputation provides an indication of the importance and/or desirability of reading messages from the Person. Example properties of a Communications_Reputation vertex include: email reputation (e.g., a numerical value calculated based on a weighted combination of factors such as how often the Person's emails are opened, deleted without reading, replied-to, marked as junk, etc.) and third-party messaging system (e.g., Slack, Teams, etc.) reputation (e.g., a numerical value calculated based on a weighted combination of factors such as how often the Person's messages are "liked" (or analogous), replied-to, etc.).

Usage_Pattern vertices 816 represent patterns of usage of any type of computing system (e.g., email, a third-party messaging service, a CRM, etc.). Example properties of a Usage_Pattern vertex include: the name of the system to which the pattern applies, the number of times the Person has used the system, the frequency with which the Person uses the system, the typical duration with which the person uses the system, and the duration of the Person's current session (if any) on the system. For purposes of illustration, two Usage_Pattern vertexes 816a and 816b are shown.

Devices_Used vertices 818 represent devices used to access computing system. Example properties of a Devices_Used vertex include: the make of the device, model of the device, MAC address, SIM number, and/or other unique identifier of the device, and/or the like. In an example implementation, devices used is determined based on requests for remotely-hosted content received by the email processor 102.

Services_Used vertices 820 represent services used in combination with a System_Used. For example, services used with an email system may include the email host (e.g., Microsoft, Google, an self-hosted Exchange server, etc.), email delivery/tracking services (e.g., MailChimp®, SendGrid®, etc.), email clients (e.g., Outlook®, Gmail®), security services (e.g., Mimecast®, Exchange Online Protection®, etc.) and/or the like. In an example implementation, Services_Used with email are determined by inspecting email headers and tracking objects embedded in email messages (e.g., links to remotely-hosted content).

Content_Used vertices 822 represent content present in communications. Example properties of a Content_Used vertex include: saluttions_used (e.g., "Hi," "Dear," "sincerely," etc.), signatures_used (e.g. name, telephone numbers, links, logos, and/or the like)

Email_Account vertices 824 represent email accounts. In an example implementation, Email_Account vertices are added as email addresses are encountered in email messages processed by the email processor 102.

Domain vertices 826 represent Internet domains. Example properties of a Domain include any fields available in DNS records associated with the name (e.g., MX records, SPF records, DKIM records, CNAME records, etc.). For purposes of illustration, two Domain vertexes 826a and 826b are shown.

Display_Name vertices 828 represent email display names (the part typically shown in a mail user agent.) In an example implementation, each Display_Name vertex corresponds to a single name (e.g., a first name or a last name) For example, email john@company.com may use the display name "John Doe" and may be associated with a "John" Display_Name vertex and a "Doe" Display_Name vertex. For purposes of illustration, two Display_Name vertexes 828a and 828b are shown.

Employee_Of edges indicate relationships between person vertices and company vertices.

Access_Location edges indicate relationships between Access_Location vertices and other vertices such as Company vertices and Usage_Pattern vertices.

Topic_Distribution edges indicate relationships between Discussion_Topic vertices and other vertices such as Person vertices.

Sentiment_Distribution edges indicate relationships between Communications_Sentiment vertices and other vertices such as Person vertices.

Reputation edges indicate relationships between Communication_Reputation vertices and other vertices such as Person vertices.

System_Used edges indicate relationships between Usage_Pattern vertices and other vertices such as Person vertices. Example properties of a Systems_Used vertex include the type of system (e.g., "email," "Slack®, etc.)

Access_Location edges indicate relationships between Access_Location vertices and other vertices such as Usage_Pattern vertices and Company vertices.

Common_Device edges indicate relationships between Device vertices and other vertices such as Usage_Pattern vertices.

Common_Service edges indicate relationships between Services_Used vertices and other vertices such as Usage_Pattern vertices.

Common_Content edges indicate relationships between Content_Used vertices and other vertices such as Usage_Pattern vertices.

Communicates_With edges indicate relationships between Person vertices and other Person vertices. Example properties of a Communicates_With edge include: count of communications (over some determined time period), frequency of communications, time distribution of communications, system of communication (e.g., email, Slack, etc.), and a timestamp of the last communication.

Email_Belongs_To edges indicate relationships between Email_Account vertices and Person vertices.

Email_Account_Of edges indicate relationships between Email_Account vertices and Domain vertices.

Email_Domain_Of edges indicate relationships between Domain vertices and Email_Account vertices.

Uses_Name edges indicate relationships between Person vertices and Display_Name vertices.

Figure 9:
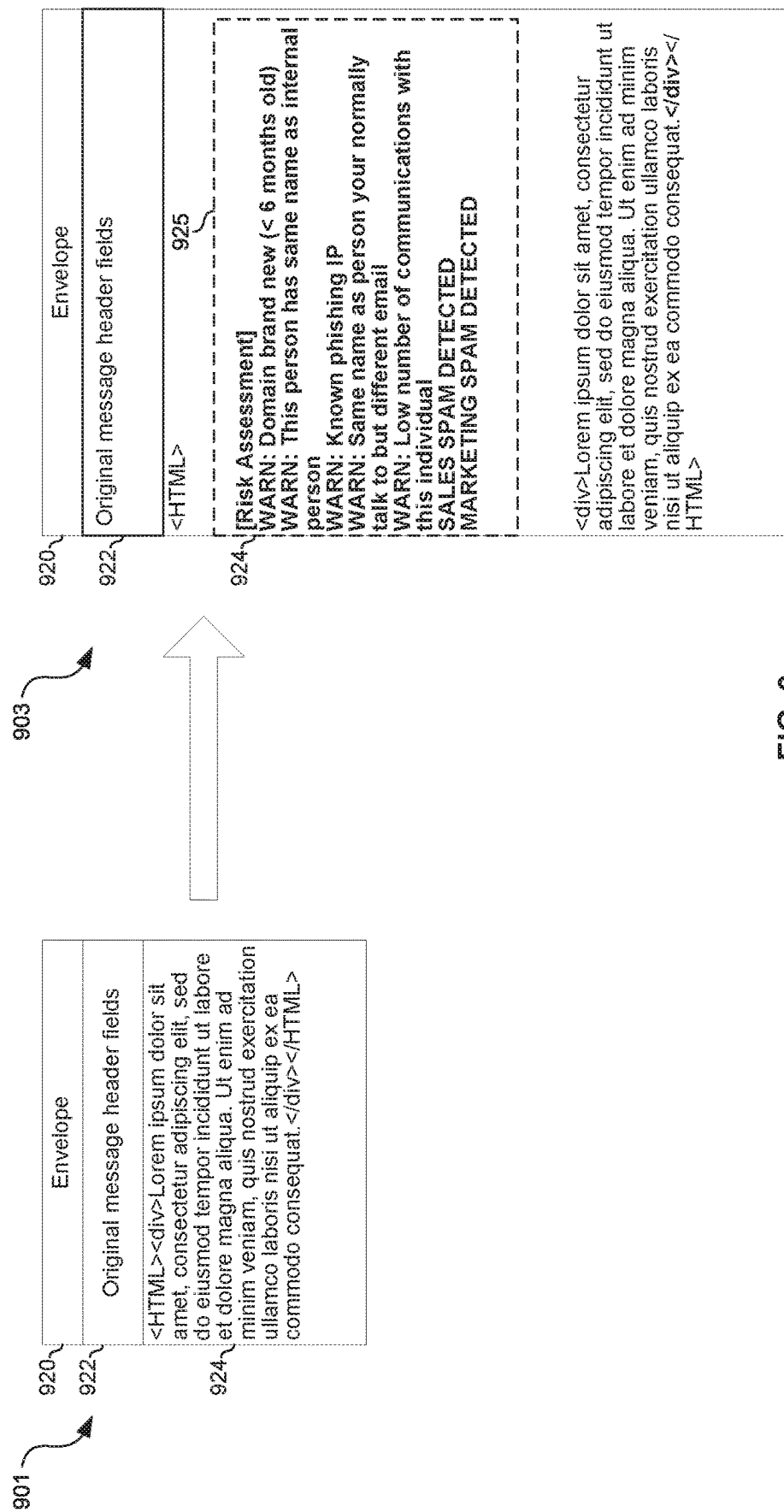
FIG. 9 depicts generation of a replacement email message based on relationships among entities associated with the email message.

FIG. 9 depicts generation of a replacement email message based on relationships among entities associated with the email message. The replacement email message generation circuitry 212 analyzes the original email message 901 with reference to the DBMS 218 (e.g., having the schema shown in FIG. 8) and, based on the analysis, determines to insert a risk assessment 924 into the body of the replacement email message 903 (e.g., above the original text of the email message). The risk assessment may comprise text and/or images.

In the example shown, the risk assessment 924 warns the recipient that domain of the sender was registered less than 6 months ago (which may be a sign that it was newly registered for sending spam or phishing emails). The registration date of the domain may be a property of the Domain entity in the database.

In the example shown, the risk assessment 924 warns the recipient the email address has the same Display_Name as a Person in the recipient's Company, but that this email is not associated with that Person (i.e., a possible spoofing/impersonation warning).

In the example shown, the risk assessment 924 warns the recipient that the email came from an IP address associated with previous phishing attempts (which may be a property of a Domain entity associated with the email).

In the example shown, the risk assessment 924 warns the recipient the email address has the same Display_Name as a Person that the recipient regularly exchanges emails with, but that this email has a different Email_Address not associated with that Person (i.e., a possible spoofing/impersonation warning).

In the example shown, the risk assessment 924 warns the recipient that the email message came from an Email_Address with which the recipient has had fewer than some threshold number of previous communications.

In the example shown, the risk assessment 924 warns the recipient that this email may be sales or marketing spam (e.g., based on a Services_Used entity associated with the sender or domain.)

Methods and systems described herein enable customized, inline processing of email messages on commercial (including free) email accounts such as Gmail without negatively impacting user experience—by the time an email message appears in a user's inbox, the email has already been processed (e.g., to remove or mitigate privacy and security risks) by the email processor 102.

In accordance with an example implementation of this disclosure, an email processor (e.g., 102) comprises mailbox management circuitry (e.g., 214) and replacement email message generation circuitry (e.g., 212). The mailbox management circuitry is operable to configure an email message filtering rule (e.g., 118) for an email mailbox (e.g., 116) such that email messages that meet criteria specified in the email message filtering rule: bypass an inbox of the email mailbox, and are assigned a first metadata value (e.g., a "to-be-processed" label) specified in the email message filtering rule. The mailbox management circuitry is operable to fetch, from the email mailbox, an original email message to which the first metadata value has been assigned. The replacement email message generation circuitry is operable to generate a replacement message (e.g., 501, 601, or 753) for the original email message (e.g., 500, 600, or 751). The replacement email message comprises: a thread identifier of the replacement message is a thread identifier of the original email message; first body content (e.g., the first HTML div of the body 756 of replacement message 753) present in the original message; and second body content not present in the original message (e.g., the second HTML div of the body 756 of replacement message 753). The mailbox management circuitry is operable to insert the replacement email message into the email mailbox. The mailbox management circuitry is operable to remove the first metadata value from the replacement email message. The mailbox management circuitry is operable to assign a second metadata value (e.g., an "inbox" label) to the replacement email message, wherein the second metadata value indicates the replacement email message is to appear in an inbox of the email mailbox. The original message may comprise third body content (e.g., the image tag of original email 600), which the replacement message does not include. The third body content may be a first HTML tag (e.g., image tag of original email message 751), and the second body content may be a second HTML tag (e.g., image tag of email message 753), a position of the first HTML tag within the original email message matches a position of the first HTML tag within the replacement email message (i.e., on the same line, character position, and/or screen coordinates). The third body content may be a first uniform resource locator (URL) (e.g., the URL in the image tag of email message 751) and the second body content may comprise a second URL (e.g., the URL in the image tag of email message 753). The first URL may target (e.g., trigger a HTTP GET request for) first content hosted on a first server, and the second URL may target (e.g., trigger a HTTP GET request for) second content hosted on a second server. The first content and the second content may be two copies of the same file (e.g., a png, jpeg, gif, or other image file). The second body content may comprise risk assessment text and/or a risk assessment image (e.g., text and/or imagery of 924). The risk assessment text and/or the risk assessment image comprise one or more of a notice about: the domain of the sender of the original email message (e.g., its age, it containing uncommon characters, it being a close misspelling of another domain, etc.); a notice about the name of the sender of the original email message (e.g., the email address containing uncommon characters, being a close misspelling of another email address, number of email sent to and/or received from the email address, whether others had sent email messages to and/or received messages from the email address, etc.); and a notice about the IP address from which the original email message was sent (e.g., it being on a blacklist).

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
configuring, by mailbox management circuitry of an email processor system, an email message filtering rule for an email mailbox, wherein email messages
that meet criteria specified in the email message filtering rule:
bypass an inbox of the email mailbox; and
are assigned a first metadata value specified in the email message filtering rule;
fetching, by the mailbox management circuitry from the email mailbox, an original email message to which the first metadata value has been assigned;
generating, by replacement email message generation circuitry, a replacement email message for the original email message, wherein the replacement email message:
comprises a thread identifier of the original email message;

comprises first body content present in the original email message; and comprises second body content not present in the original email message;

inserting, by the mailbox management circuitry, the replacement email message into the email mailbox;

removing, by the mailbox management circuitry, the first metadata value from the replacement email message; and assigning, by the mailbox management circuitry, a second metadata value to the replacement email message, wherein the second metadata value causes the replacement email message to appear in an inbox of the email mailbox.

2. The method of claim 1, wherein:
the original email message comprises third body content; and
the replacement message does not include the third body content.

3. The method of claim 2, wherein:
the third body content is a first HTML tag;
the second body content is a second HTML tag; and
a position of the first HTML tag within the original email message matches a position of the first HTML tag within the replacement email message.

4. The method of claim 2, wherein:
the third body content is a first uniform resource locator (URL); and
the second body content comprises a second URL.

5. The method of claim 4, wherein:
the first URL targets first content hosted on a first server; and
the second URL targets second content hosted on second server.

6. The method of claim 5, wherein the first content and the second content are two copies of a same file.

7. The method of claim 6, wherein the file is an image file.

8. The method of claim 1, wherein the second body content comprises risk assessment text or a risk assessment image.

9. The method of claim 8, wherein the risk assessment text or the risk assessment image comprise one or more of:
a notice about a domain of a sender of the original email message;
a notice about a name of a sender of the original email message; and
a notice about an IP address from which the original email message was sent.

10. The method of claim 8, wherein the risk assessment text or the risk assessment image comprise a notice about a number of emails sent to or received from a sender of the original email message.

11. A system comprising:
a memory, mailbox management circuitry, and replacement email message generation circuitry, wherein:
the mailbox management circuitry is operable to configure an email message filtering rule for an email mailbox such that email messages that meet criteria specified in the email message filtering rule:
bypass an inbox of the email mailbox; and
are assigned a first metadata value specified in the email message filtering rule;
the mailbox management circuitry is operable to fetch, from the email mailbox, an original email message to which the first metadata value has been assigned;
the replacement email message generation circuitry is operable to generate a replacement message for the original email message, wherein the replacement email message:
comprises a thread identifier of the original email message;
comprises first body content present in the original email message; and
comprises second body content not present in the original email message;
the mailbox management circuitry is operable to insert the replacement email message into the email mailbox;
the mailbox management circuitry is operable to remove the first metadata value from the replacement email message; and
the mailbox management circuitry is operable to assign a second metadata value to the replacement email message, wherein the second metadata value indicates the replacement email message is to appear in an inbox of the email mailbox.

12. The system of claim 11, wherein:
the original email message comprises third body content; and
the replacement message does not include the third body content.

13. The system of claim 12, wherein:
the third body content is a first HTML tag;
the second body content is a second HTML tag; and
a position of the first HTML tag within the original email message matches a position of the first HTML tag within the replacement email message.

14. The system of claim 12, wherein:
the third body content is a first uniform resource locator (URL); and
the second body content comprises a second URL.

15. The system of claim 12, wherein:
the third body content is a first uniform resource locator (URL); and
the second body content comprises a second URL.

16. The system of claim 15, wherein the first content and the second content are two copies of a same file.

17. The system of claim 16, wherein the file is an image file.

18. The system of claim 11, wherein the second body content comprises risk assessment text or a risk assessment image.

19. The system of claim 18, wherein the risk assessment text or the risk
assessment image comprise one or more of:
a notice about a domain of a sender of the original email message;
a notice about a name of a sender of the original email message; and
a notice about an IP address from which the original email message was sent.

20. The system of claim 18, wherein the risk assessment text or the risk assessment image comprise a notice about a number of emails sent to or received from the sender of the original email message.

* * * * *